United States Patent [19]
Sidlauskas

[11] 3,734,535
[45] May 22, 1973

[54] TRICYCLE HAVING DRIVING ENERGY STORING ARRANGEMENT

[76] Inventor: Donald M. Sidlauskas, 3950 N.W. 32nd Terrace, Fort Lauderdale, Fla. 33309

[22] Filed: Aug. 11, 1971

[21] Appl. No.: 170,897

[52] U.S. Cl................................280/215, 280/282
[51] Int. Cl. .............................................B62m 1/10
[58] Field of Search....................280/215, 212, 289, 280/293, 295, 264, 150 A; 180/76

[56] References Cited

UNITED STATES PATENTS

| | | | |
|---|---|---|---|
| 250,589 | 12/1881 | Silver | 280/215 |
| 1,245,317 | 11/1917 | Cashner | 280/264 |
| 1,612,739 | 12/1926 | Matsumoto | 280/215 |
| 2,168,440 | 8/1939 | Dole | 280/150 A X |
| 2,793,877 | 5/1957 | Meier | 280/293 |
| 3,284,096 | 11/1966 | Hansen et al. | 280/289 |
| 3,096,100 | 7/1963 | Clarke et al. | 280/282 |

*Primary Examiner*—Kenneth H. Betts

[57] ABSTRACT

A tricycle for a child to ride upon, the tricycle including a frame supported at its rear end upon a pair of rear wheels mounted on a rear axle, the front end of the frame being supported upon a steering column supported upon a single front wheel, the steering wheel being controlled in direction by handle bars, the device including foot pedals for winding up a pair of springs for giving driving power to the rear wheels, and the handle bars when pushed forwardly acting as a level for a set of brakes.

1 Claim, 2 Drawing Figures

PATENTED MAY 22 1973

3,734,535

INVENTOR
DONALD M. SIDLAUSKAS

TRICYCLE HAVING DRIVING ENERGY STORING ARRANGEMENT

This invention relates generally to children's vehicles.

A principal object of the present invention is to provide a tricycle that is designed to do a wheelie by pushing forward on a set of handle bars so to act as a lever for a set of brakes.

Another object of the present invention is to provide a wheelie which embodies the latest and contemporary concepts of motorcycling and automobile racing.

Yet another object of the present invention is to provide a wheelie which will promote enjoyable activity for a child and which is completely safe.

Other objects of the present invention are to provide a wheelie which is simple in design, inexpensive to manufacture, rugged in construction, easy to use and efficient in operation.

These and other objects will be readily evident upon a study of the following specification and the accompanying drawing wherein.

Figures 1, 2:
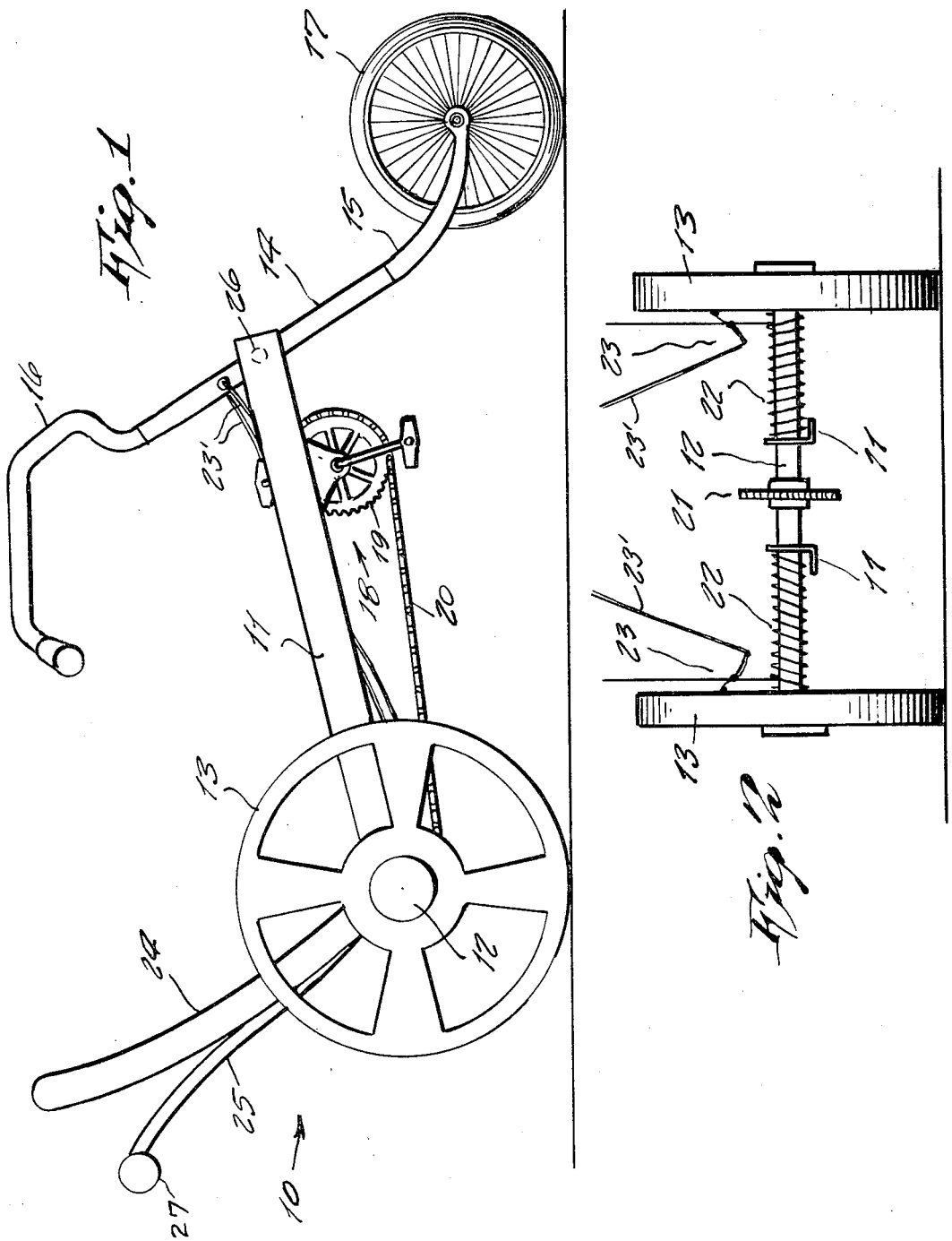
FIG. 1 is a side elevation view of the present invention.
FIG. 2 is a fragmentary rear elevation view thereof.

Referring now to the drawing in detail, the reference numeral 10 represents a wheelie according to the present invention wherein there is a frame 11 which at its rear end is supported upon a rear axle 12, the rear axle being mounted upon a pair of spaced apart rear wheels 13. The forward end of the frame 11 is supported upon a steering column 14 of tubular character which is supported upon a steering post 15 which upon its upper end incorporates a set of handle bars 16 and which at its lower end is biforcated and supported upon a front wheel 17.

A foot pedal mechanism 18 is carried by the frame 11 and which includes a sprocket 19 for driving an endless sprocket chain 20 that is also passed around a sprocket 21 on the rear shaft 12.

A pair of coil springs 22 are fitted around the rear axle 12 and which serve as a driving power for the vehicle after becoming wound up.

The present vehicle also incorporates a pair of wheel brakes 23.

The tricycle is designed to do a wheelie by pushing forward on the handle bars which act as a lever for the brakes. Operating the pedals can wind up the springs 22 so that they store up driving energy. By pulling back on the handle bars the brakes are released by linkage 23' which releases the spring thus causing a forward energy to be transmitted to the rear wheels.

An off balance situation occurs causing the seat 24 to lean backwards, the front wheel to raise up on the rear axle pivot point. This motion continues until it is arrested by the leaf spring 25 at the rear of the seat 24.

A minor wheel 27 fastened within the leaf spring assists in the forward motion caused by the unwinding of the spring in the rear wheels. As the energy is expended, the forward motion of the wheelie is slackened and the rider leans forward to repeat the cycle.

It is to be noted that a ratchet device is designed within the wheelie so to allow for either a normal cycle or a wheelie use of the device.

It is to be noted that in the present construction, the drive shaft or axle 12 is independent of the wheels rotationally. One end of the coil springs 22 are welded to the shaft and the opposite ends of the springs 22 are welded to the wheels 13.

A pivot 26 permits the forward pivoting for the brakes and the backwards motion for the wheelie.

A wheelie may be performed by winding the integral springs. Pushing forward causes the off center characteristics and leaning the wheelie backwards so to cause the forward motion.

Restraint may be accomplished by forward motion of the front wheel operating the brake and then causing the spring to be wound by a crank.

What I now claim is:

1. In a wheelie, the combination of a vehicle incorporating a frame which at its rear end is supported upon a transverse rear axle, said rear axle being supported upon a pair of spaced apart rear wheels, a front end of said frame being supported pivotally free upon a steering column fitted on a steering post which at its upper end is provided with a pair of handle bars and at its lower end thereof being supported upon a single front wheel, said frame supporting a pedal mechanism for being operated by a rider's feet, said frame carrying a seat located in front of a leaf spring which has a minor wheel fastened thereto, said food pedal mechanism including a sprocket integral with foot pedals, said sprocket having an endless sprocket chain attached therearound and around another sprocket mounted upon said rear axle, each of said rear wheels being mounted rotationally free upon said rear axle, a pair of coil springs being fitted around said rear axle, one end of each of said springs being welded to said rear shaft, and the opposite ends of said coil springs being welded to said rear wheels, said vehicle incorporating a pair of brake units, each one of which serves to brake one of the said rear wheels when said handle bars are pushed forwardly to hold the vehicle while the springs are being wound by the pedal mechanism prior to release.

* * * * *